US012628227B2

(12) United States Patent
Ratnam et al.

(10) Patent No.: US 12,628,227 B2
(45) Date of Patent: May 12, 2026

(54) METHOD AND APPARATUS FOR USING AAR TO SUPPORT EMLSR OPERATION

(71) Applicant: Samsung Electronics Co., Ltd., Suwon-si (KR)

(72) Inventors: Vishnu Vardhan Ratnam, Plano, TX (US); Peshal Nayak, Plano, TX (US); Boon Loong Ng, Plano, TX (US); Rubayet Shafin, Allen, TX (US); Ahmed Atef Ibrahim Ibrahim, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 17/935,040

(22) Filed: Sep. 23, 2022

(65) Prior Publication Data

US 2023/0109759 A1     Apr. 13, 2023

Related U.S. Application Data

(60) Provisional application No. 63/277,952, filed on Nov. 10, 2021, provisional application No. 63/253,656, filed on Oct. 8, 2021.

(51) Int. Cl.
*H04W 76/18*          (2018.01)
*H04W 76/15*          (2018.01)

(52) U.S. Cl.
CPC ........... *H04W 76/18* (2018.02); *H04W 76/15* (2018.02)

(58) Field of Classification Search
CPC .............................. H04W 76/18; H04W 76/15
See application file for complete search history.

(56) References Cited

U.S. PATENT DOCUMENTS

2021/0007168 A1    1/2021    Asterjadhi et al.
2021/0212118 A1    7/2021    Lu et al.
(Continued)

FOREIGN PATENT DOCUMENTS

CN          116669230 A       8/2023
WO       2023137725 A1       7/2023
(Continued)

OTHER PUBLICATIONS

Extended European Search Report issued Sep. 19, 2024 regarding Application No. 22878844.4, 11 pages.
(Continued)

*Primary Examiner* — Parth Patel

(57)          ABSTRACT

Methods and apparatuses for facilitating recovery from loss of medium synchronization for multi-link devices (MLDs) and renegotiating traffic identifier (TID)-to-link mapping for enhanced multi-link single radio (EMLSR) operation of MLDs in a wireless local area network. A non-access point (AP) MLD comprises STAs, each comprising a transceiver configured to form a link with a corresponding AP of an AP MLD, and a processor operably coupled to the STAs. A subset of the links are EMLSR links that are configured to operate in an EMLSR mode of operation. The processor is configured to generate, based on a determination that an EMLSR frame exchange sequence is occurring on a first one of the EMLSR links, a request for AP-assisted medium synchronization recovery (AAR) for a set of the other EMLSR links. At least one of the transceivers is further configured to transmit, to the AP MLD, the request for AAR.

14 Claims, 12 Drawing Sheets

(56) References Cited

U.S. PATENT DOCUMENTS

| | | | | |
|---|---|---|---|---|
| 2021/0315025 | A1 | 10/2021 | Seok et al. | |
| 2023/0109759 | A1* | 4/2023 | Ratnam | H04W 56/0015 |
| | | | | 370/329 |
| 2023/0388753 | A1* | 11/2023 | Wang | H04W 48/12 |
| 2024/0244481 | A1* | 7/2024 | Viger | H04W 28/0278 |
| 2024/0349081 | A1* | 10/2024 | Kim | H04B 7/0413 |
| 2024/0373465 | A1* | 11/2024 | Lu | H04L 5/0053 |
| 2024/0407031 | A1* | 12/2024 | Lin | H04L 5/0053 |

FOREIGN PATENT DOCUMENTS

| | | |
|---|---|---|
| WO | 2023155661 A1 | 8/2023 |
| WO | 2023177164 A1 | 9/2023 |

OTHER PUBLICATIONS

IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pages.

IEEE P802.11be/D1.1; Draft Standard for Information technology—Telecommunications and information exchange between systems Local and metropolitan area networks—Specific requirements; "Part 11: Wireless LAN Medium Access Control (MAC) and Physical Layer (PHY) Specifications, Amendment 8: Enhancements for extremely high throughput (EHT)"; Jul. 2021; 685 pages.

IEEE Std 802.11—2016; IEEE Standard for Information Technology—Telecommunications and information exchange between systems—Local and metropolitan area networks—Specific requirements; "Part 11: Wireless LAN Medium Access Control (MAC) and Physical Layer (PHY) Specifications"; Dec. 7, 2016, 3534 pages.

IEEE P802.11be/D1.2; Draft Standard for Information technology—Telecommunications and information exchange between systems Local and metropolitan area networks—Specific requirements; "Part 11: Wireless LAN Medium Access Control (MAC) and Physical Layer (PHY) Specifications, Amendment 8: Enhancements for extremely high throughput (EHT)"; Sep. 2021; 735 pages.

International Search Report and Written Opinion issued Jan. 13, 2023 regarding International Application No. PCT/KR2022/014885, 8 pages.

Park, "CC36 Comment Resolution for EMLSR—Part 1", doc.: IEEE 802.11-21/283r2, Sep. 2021, 11 pages.

Das et al., "PDT MAC MLO: NSTR blindness additional rules", doc.: IEEE 802.11-21/0221r9, Apr. 2021, 7 pages.

* cited by examiner

406

| Assisted AP Link ID bitmap (16 bits) | Prioritized access bit (1 bit) | Reserved (3 bits) |
|---|---|---|

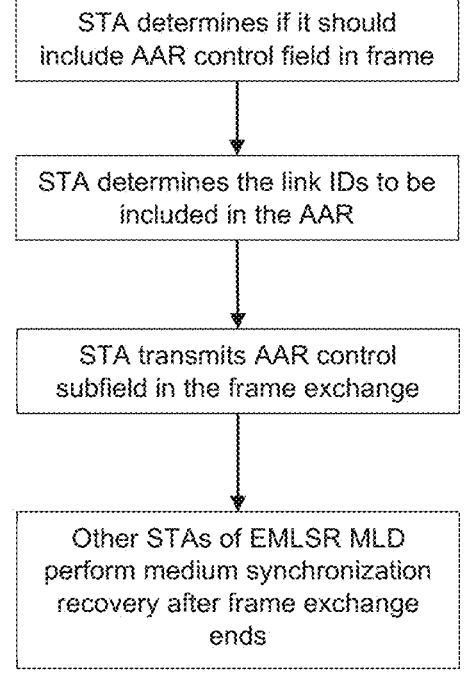

STA determines if it should include AAR control field in frame

STA determines the link IDs to be included in the AAR

STA transmits AAR control subfield in the frame exchange

Other STAs of EMLSR MLD perform medium synchronization recovery after frame exchange ends EMLSR non-AP MLD operation

FIG. 8A

If it supports AAR, AP of AP MLD receives AAR control subfield and determines indicated APs If applicable, AP MLD determines the goal of AAR After end of frame exchange sequence, the indicated APs of AP MLD check their eligibility for trigger frame transmission If eligible, one of the indicated APs of AP MLD transmits trigger frame to EMLSR non-AP MLD AP MLD operation

FIG. 8B

| EOMNF action frame | Order | Information |
|---|---|---|
| | 1 | Category |
| | 2 | EHT Action |
| | 3 | Dialogue Token |
| | 4 | EML Control |

| EMLSR Mode (1 bit) | EMLMR Mode (1 bit) | EMLSR Link bitmap (16 bits) | Reserved (6 bits) |
|---|---|---|---|

| EOMNF action frame | Order | Information |
|---|---|---|
| | 1 | Category |
| | 2 | EHT Action |
| | 3 | Dialogue Token |
| | 4 | EML Control |

| EMLSR Mode (1 bit) | EMLMR Mode (1 bit) | EMLSR Link bitmap (16 bits) | Default TID-to-link mapping (1 bit) | Reserved (5 bits) |
|---|---|---|---|---|

| Order | Information |
|-------|-------------|
| 1 | Category |
| 2 | EHT Action |
| 3 | Dialogue Token |
| 4 | EML Control |
| 5 | TID-to-link mapping present bit |
| 6 | TID-to-link mapping element (optional) |

EOMNF action frame

| Element ID (1 octet) | Length (1 octet) | Element ID extension (1 octet) | TID-to-link mapping Control (2 octet) | Link mapping of TID 0 (0 or 2 octet) | ... | Link mapping of TID 7 (0 or 2 octet) |
|---|---|---|---|---|---|---|

FIG. 15

| Order | Information |
|-------|-------------|
| 1 | Category |
| 2 | EHT Action |
| 3 | Dialogue Token |
| 4 | EML Control |
| 5 | Status Code |
| 6 | Downlink TID-to-link mapping element (optional) |
| 7 | Uplink TID-to-link mapping element (optional) |

EOMNF action frame

| Element ID (1 octet) | Length (1 octet) | Element ID extension (1 octet) | TID-to-link mapping Control (2 octet) | Link mapping of TID 0 (0 or 2 octet) | ... | Link mapping of TID 7 (0 or 2 octet) |
|---|---|---|---|---|---|---|

FIG. 16

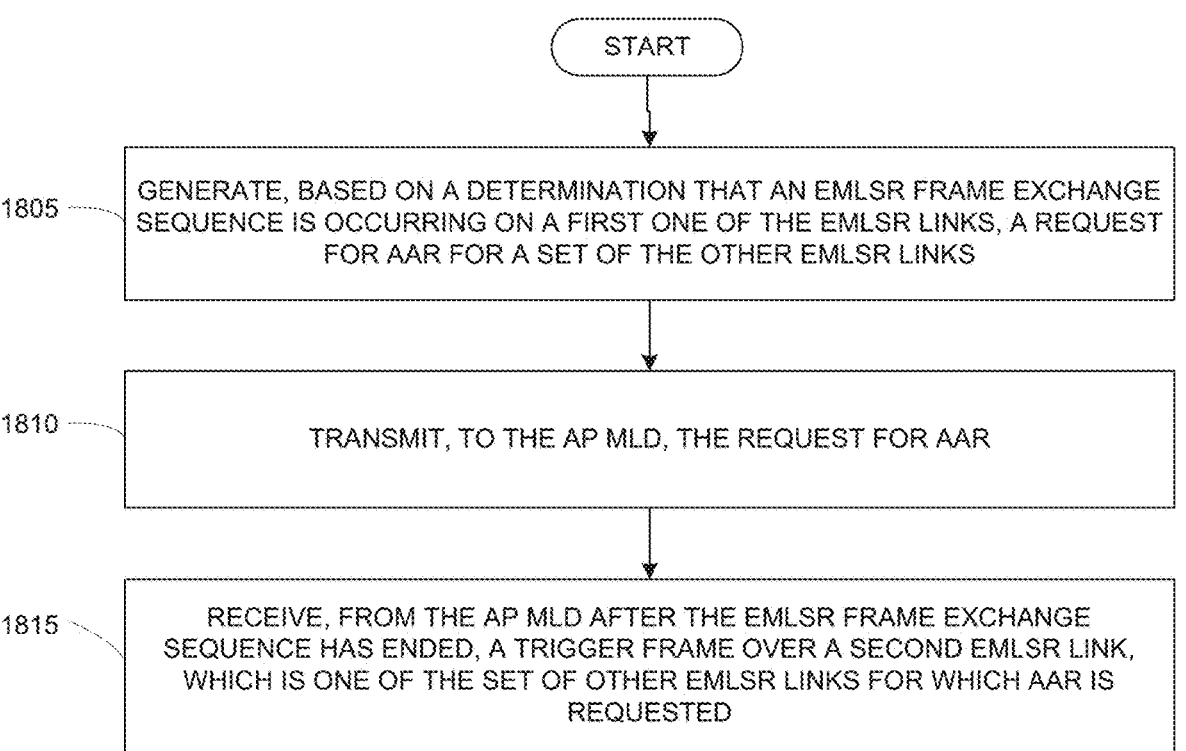

1805 — GENERATE, BASED ON A DETERMINATION THAT AN EMLSR FRAME EXCHANGE SEQUENCE IS OCCURRING ON A FIRST ONE OF THE EMLSR LINKS, A REQUEST FOR AAR FOR A SET OF THE OTHER EMLSR LINKS

1810 — TRANSMIT, TO THE AP MLD, THE REQUEST FOR AAR

1815 — RECEIVE, FROM THE AP MLD AFTER THE EMLSR FRAME EXCHANGE SEQUENCE HAS ENDED, A TRIGGER FRAME OVER A SECOND EMLSR LINK, WHICH IS ONE OF THE SET OF OTHER EMLSR LINKS FOR WHICH AAR IS REQUESTED

FIG. 18

METHOD AND APPARATUS FOR USING AAR TO SUPPORT EMLSR OPERATION

CROSS-REFERENCE TO RELATED APPLICATION AND CLAIM OF PRIORITY

This application claims priority under 35 U.S.C. § 119(e) to U.S. Provisional Patent Application No. 63/253,656 filed on Oct. 8, 2021, and U.S. Provisional Patent Application No. 63/277,952 filed on Nov. 10, 2021, which are hereby incorporated by reference in their entirety.

TECHNICAL FIELD

This disclosure relates generally to transmission efficiency in wireless communications systems that include multi-link devices. Embodiments of this disclosure relate to methods and apparatuses for improving the speed of medium synchronization recovery for links in a multi-link device in a wireless local area network communications system. Embodiments of this disclosure further relate to methods and apparatuses for ensuring that traffic identifiers are mapped to appropriate links in a multi-link device in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

The component of an MLD that is responsible for transmission and reception on one link is referred to as a station (STA). In several embodiments of non-AP MLDs, transmission on one of the links can cause limitations or impairments on the STAs of the non-AP MLD operating other links. For example, in one class of non-AP MLDs, a pair of links can form a non-simultaneous transmit and receive (NSTR) pair. In an NSTR pair of links, transmission on one link by a STA of the non-AP MLD can cause a very high self-interference at the STA of the non-AP MLD operating on the other link of the NSTR pair. Thus, during a transmission on one link by a non-AP MLD, the STA on the other link may be incapable of sensing the channel occupancy and its network allocation vector (NAV) timer may become outdated, causing a loss of medium synchronization.

To prevent a loss of medium synchronization from affecting other transmissions in the network, a medium synchronization recovery procedure is defined in IEEE 802.11be which shall be followed by a STA that has lost medium synchronization after it is able to reliably sense the channel again, e.g., in the case of a STA operating on a link of an NSTR link pair, after the transmission from the other STA of the NSTR link pair has ended. In essence, the medium synchronization recovery procedure involves the affected STA initializing a timer called a MediumSyncDelay timer and pursuing a more conservative channel access procedure until either the expiration of the timer or recovery of medium synchronization, whichever occurs earlier. This conservative approach of initiating a transmit opportunity (TXOP) by the non-AP STA when its MediumSyncDelay>0 involves transmission of a request-to-send (RTS) as the first frame to gain TXOP, not attempting more than MSD_TXOP_MAX TXOPs (default 1) and using CCA_ED threshold equal to dot11MSDOFDMEDthreshold (default −72 dBm).

The conservative channel access procedure for a STA of a non-AP MLD during MediumSyncDelay>0 can be inefficient and can cause degradation in the system throughput. This is especially true since such loss of medium synchronization may happen frequently in NSTR devices. It may also be unnecessary in lightly loaded scenarios where such conservative access is not required.

Thus, to improve performance, an AP-assisted mechanism for medium synchronization recovery has been defined for NSTR scenarios called AP-assisted recovery (AAR). A non-AP STA affiliated with a non-AP MLD that supports AAR and that is performing a frame exchange with an associated AP affiliated with an AP MLD can include a frame in the frame exchange that signals the AP MLD to transmit a Trigger frame to another non-AP STA affiliated with the non-AP MLD in order to solicit an uplink (UL) physical protocol data unit (PPDU) from the other non-AP STA, thereby assisting the other non-AP STA to quickly gain access to the channel.

An MLD may also serve several different types of traffic categories, each being identified by a traffic identifier (TID) and having a different requirement on throughput, latency, etc. For prioritization of channel access to different TIDs on the different links, and to limit contention, the AP MLD and non-AP MLD may also negotiate a TID-to-link mapping for such MLO. Such a TID-to-link mapping would identify, for each link, which TIDs are eligible for transmission/reception. Note that the default TID-to-link mapping allows any TID to be transmitted on any link.

The non-AP MLDs in 802.11be can have different capabilities in terms of multi-link operation. Many 802.11be non-AP MLDs may only have a single radio. Enhanced Multi-Link Single Radio (EMLSR) enables a multi-link operation with a single radio. With EMLSR operation, such a non-AP MLD can achieve throughput enhancement with reduced latency—a performance close to concurrent dual radio non-AP MLDs.

In EMLSR mode, a non-AP device behaves like a single radio device that can perform channel sensing and reception of elementary packets on multiple bands/links simultaneously but can perform reliable data communication on only one link at a time. Thus, by opportunistically selecting a link for data communication where it wins the channel contention, EMLSR can improve system spectral efficiency.

SUMMARY

Embodiments of the present disclosure provide methods and apparatuses for facilitating recovery from loss of medium synchronization for MLDs and renegotiating TID-to-link mapping for EMLSR operation for MLDs in a wireless local area network.

In one embodiment, a non-AP MLD is provided, comprising STAs and a processor operably coupled to the STAs. The STAs each comprise a transceiver configured to form a link with a corresponding AP of an AP MLD, wherein a subset of the links are EMLSR links that are configured to operate in an EMLSR mode of operation. The processor is configured to generate, based on a determination that an EMLSR frame exchange sequence is occurring on a first one of the EMLSR links, a request for AAR for a set of the other EMLSR links. At least one of the transceivers is further configured to transmit, to the AP MLD, the request for AAR.

In another embodiment, an AP MLD is provided, comprising APs and a processor operably coupled to the APs. The APs each comprise a transceiver configured to form a link with a corresponding STA of a non-AP MLD, wherein at least a subset of the links are EMLSR links that are configured to operate in an EMLSR mode of operation, and at least one of the transceivers is further configured to receive, from the non-AP MLD, a request for AAR. The processor is configured to determine that the request for AAR is a request to perform, after an EMLSR frame exchange sequence on a first one of the EMLSR links has ended, AAR for a set of the EMLSR links.

In another embodiment, a method of wireless communication is provided, performed by a non-AP MLD STAs that each comprise a transceiver configured to form a link with a corresponding AP of an AP MLD, wherein at least a subset of the links are EMLSR links that are configured to operate in an EMLSR mode of operation. The method includes the steps of generating, based on a determination that an EMLSR frame exchange sequence is occurring on a first one of the EMLSR links, a request for AAR for a set of the other EMLSR links, and transmitting, to the AP MLD, the request for AAR.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-2020, "Wireless LAN Medium Access Control (MAC) and Physical Layer (PHY) Specification"

[2] IEEE P802.11be/D1.2

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A and 8B illustrate an example process for enabling medium synchronization recovery and AAR operation by an EMLSR non-AP MLD and an AP MLD according to embodiments of the present disclosure;

FIG. 15 illustrates another example format of an EOMNF action frame according to embodiments of the present disclosure;

FIG. 16 illustrates a variation of the example format of the EOMNF action frame of FIG. 15 according to embodiments of the present disclosure;

FIG. 18 illustrates an example process for facilitating recovery from loss of medium synchronization for MLDs in a WLAN according to various embodiments of the present disclosure.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that when a non-AP MLD in EMLSR mode is involved in a frame exchange sequence with an AP MLD on any one of the EMLSR links, the STAs of the non-AP MLD on the remaining EMLSR links are inactive and are unable to sense the channel, and therefore are likely to lose medium synchronization. Embodiments of the present disclosure further recognize that, for an MLD operating in EMLSR mode, recovery from medium synchronization loss can result in loss of efficiency and traffic starvation on links that are participating in EMLSR operation.

Furthermore, embodiments of the present disclosure recognize that AAR is used to facilitate fast recovery from loss of medium synchronization in order to avoid some of the downsides of AAR, such as loss of efficiency, in non-MLO devices (i.e., devices that are not MLDs). Accordingly, embodiments of the present disclosure provide methods and apparatuses to facilitate recovery from loss of medium synchronization for MLDs using AAR.

Additionally, embodiments of the present disclosure recognize that due to the operating behavior of EMLSR, the channel access patterns for a non-AP MLD can be altered significantly after activating EMLSR mode. As a result, a TID-to-link mapping that was negotiated between an AP MLD and a non-AP MLD before activating EMLSR operating mode may not be optimal for operation in EMLSR mode. Non-AP MLDs may, therefore, desire to switch to EMLSR mode only if an update to a desired TID-to-link mapping is accepted. Similarly, the AP MLD may desire to know that a new TID-to-link mapping request by a non-AP MLD is for the purpose of supporting EMLSR operation.

Embodiments of the present disclosure further recognize that existing mechanisms for TID-to-link mapping negotiation are performed outside of the context of EMLSR. Accordingly, embodiments of the present disclosure provide methods and apparatuses to facilitate updating a TID-to-link mapping between a non-AP MLD and an AP MLD as part of the EMLSR initiation (or activation) process.

Figure 1:
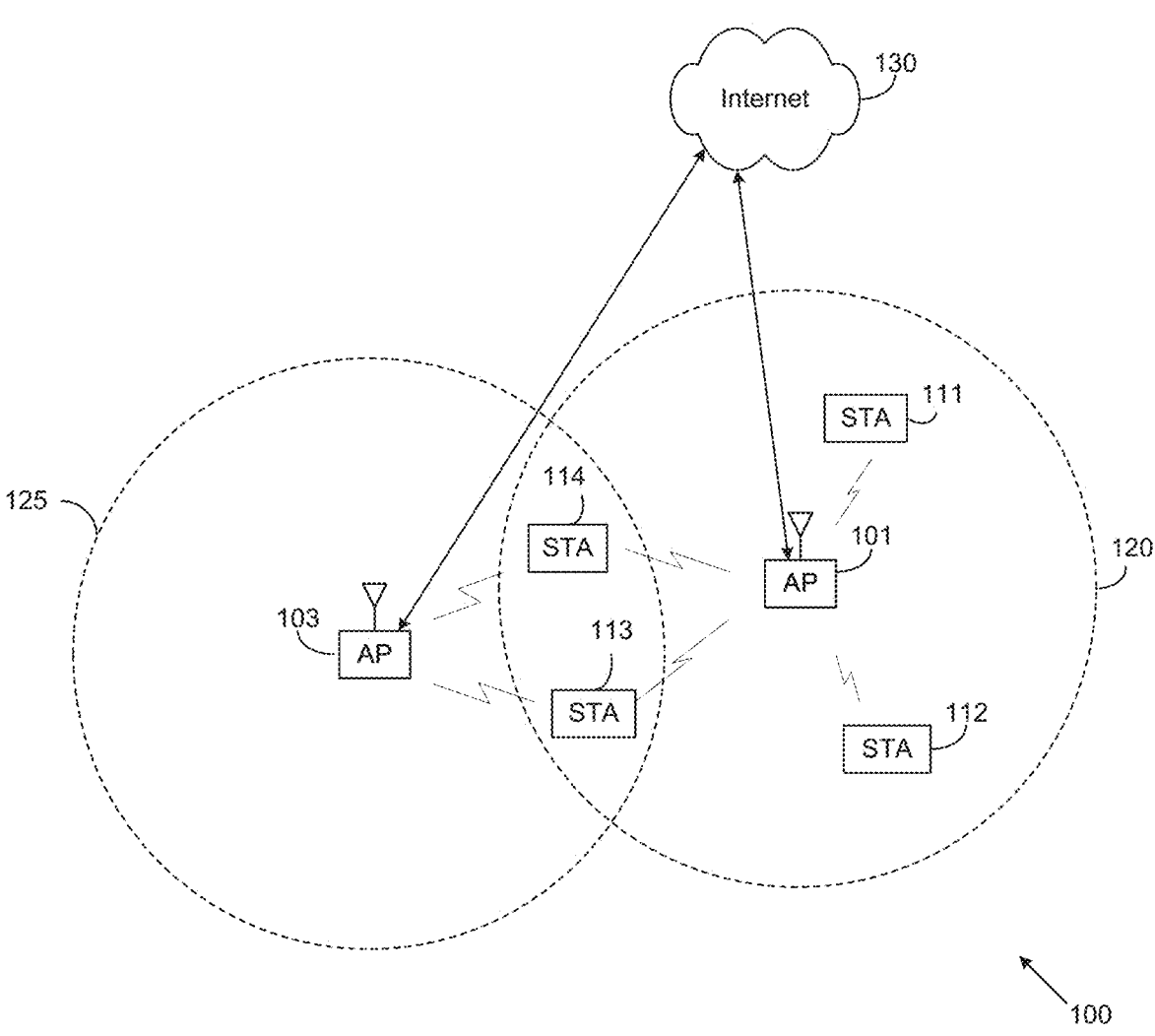
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating recovery from loss of medium synchronization for MLDs and renegotiating TID-to-link mapping for EMLSR operation for MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
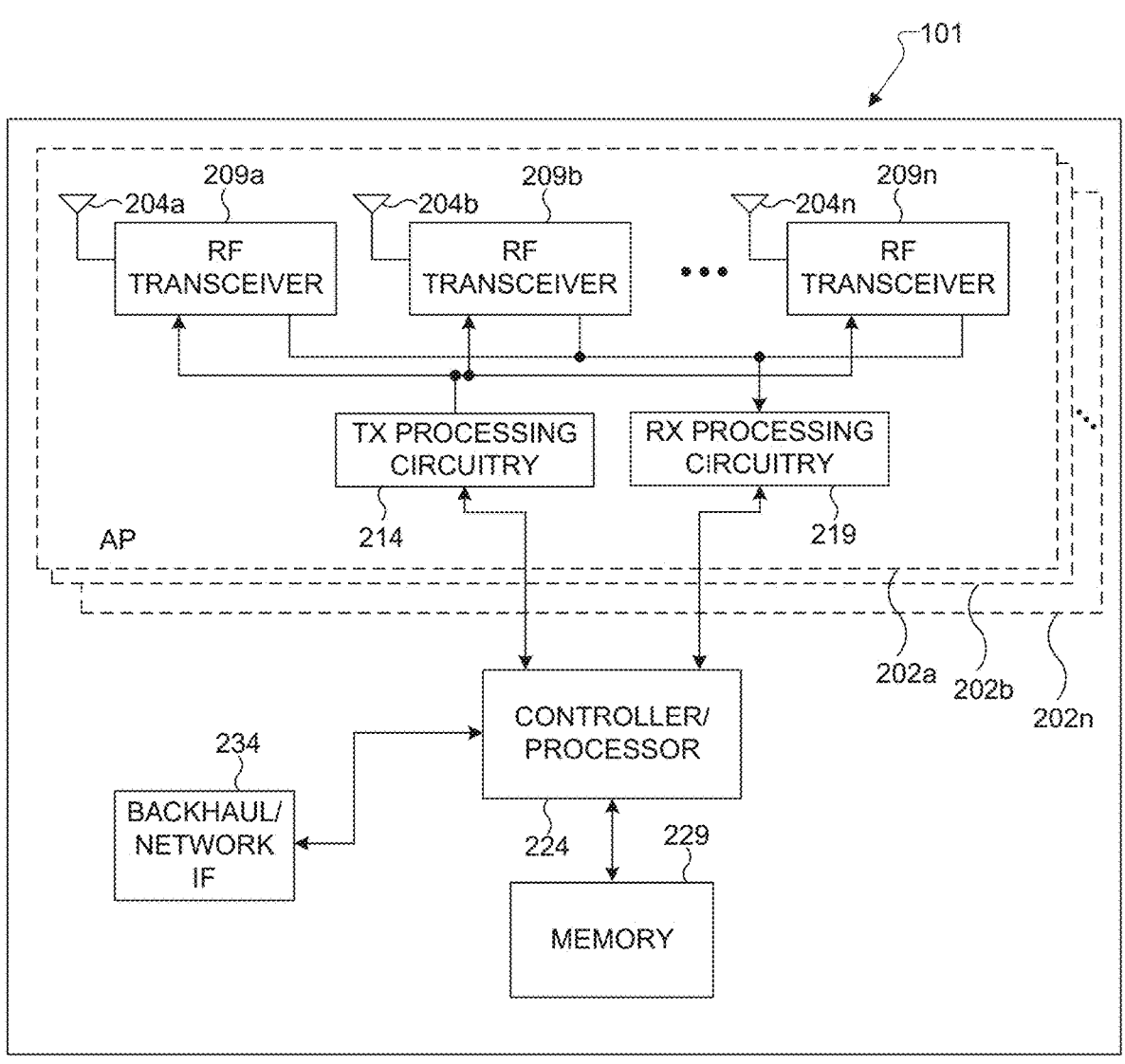
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating recovery from loss of medium synchronization for MLDs and renegotiating TID-to-link mapping for EMLSR operation for MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating recovery from loss of medium synchronization for MLDs and renegotiating TID-to-link mapping for EMLSR operation for MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
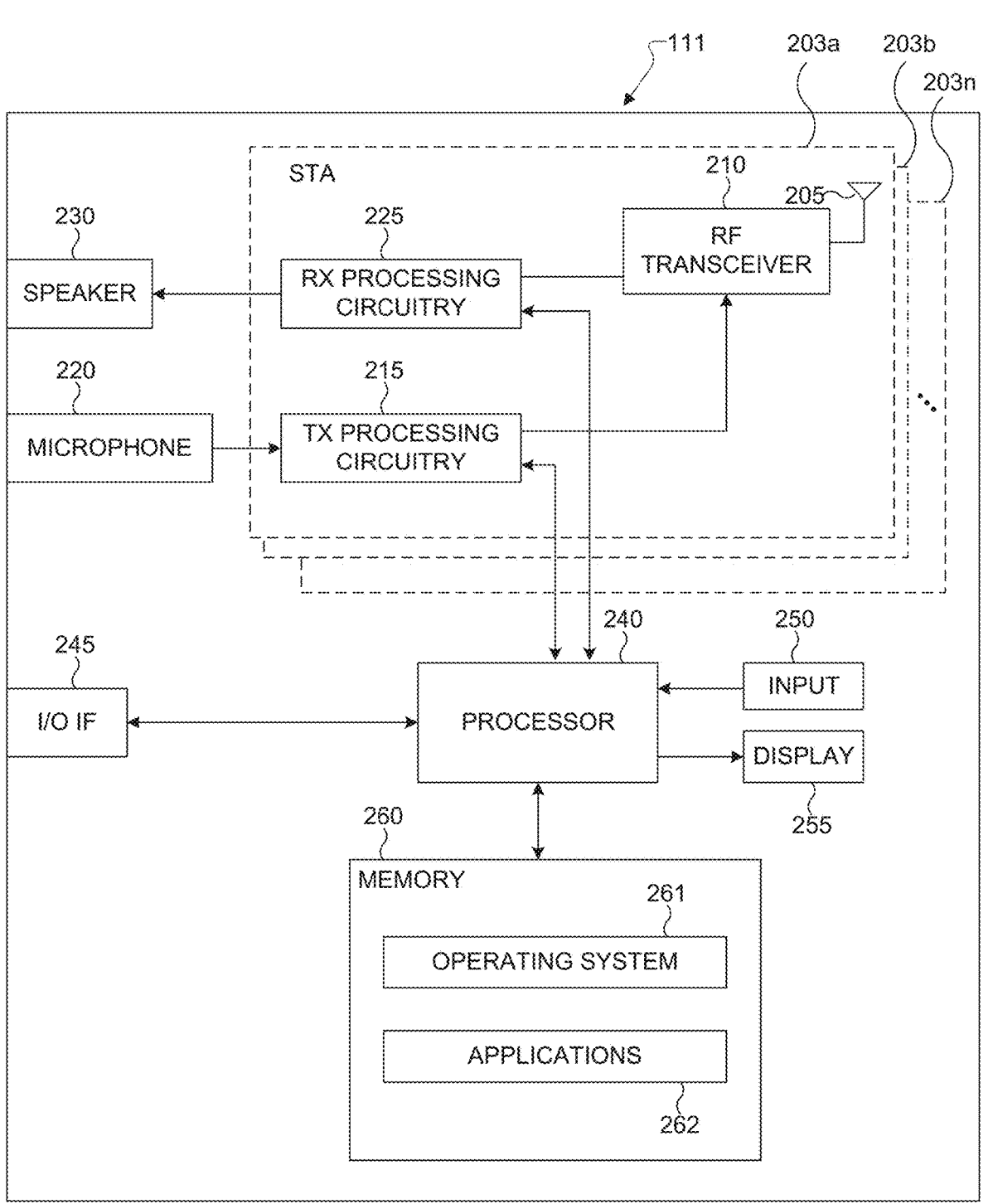
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate recovery from loss of medium synchronization for MLDs and renegotiating TID-to-link mapping for EMLSR operation for MLDs in WLANs. In some embodiments, the controller/processor 240 includes at least one microprocessor or microcontroller.

The controller/processor 240 is also capable of executing other processes and programs resident in the memory 260, such as operations for facilitating recovery from loss of medium synchronization for MLDs and renegotiating TID-to-link mapping for EMLSR operation for MLDs in WLANs. The controller/processor 240 can move data into or out of the memory 260 as required by an executing process. In some embodiments, the controller/processor 240 is configured to execute a plurality of applications 262, such as applications for facilitating recovery from loss of medium synchronization for MLDs and renegotiating TID-to-link mapping for EMLSR operation for MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

As discussed herein above, AAR may be used to facilitate recovery from loss of medium synchronization. To trigger AAR, a non-AP STA of a non-AP MLD with "dot11AAROptionImplemented" set to true (indicating that the non-AP MLD supports AAR) and that belongs to an NSTR link pair may transmit an AAR Control subfield in a frame to its associated AP affiliated with an AP MLD if it has received a Basic Multi-Link element from the AP with the AAR Support subfield set to 1 (indicating that the AP MLD supports AAR).

The AAR Control subfield transmitted by the STA affiliated with the non-AP MLD to its associated AP affiliated with the AP MLD carries the link identifier of another AP affiliated with the same AP MLD to solicit the other AP to transmit a Trigger frame. The other AP affiliated with the AP MLD should transmit a Trigger frame to another non-AP STA affiliated with the non-AP MLD (with which the AP has formed an MLO link, e.g., the other link in the NSTR link pair) to solicit a UL PPDU from the other non-AP STA if the AP MLD supports reception of the AAR Control subfield and the other AP does not have frame exchanges already scheduled with a different STA. This procedure helps the other non-AP STA of the non-AP MLD to quickly gain access to the channel, with help from the affiliated AP, even when it has MediumSyncDelay>0, thus improving system throughput.

Figure 3:
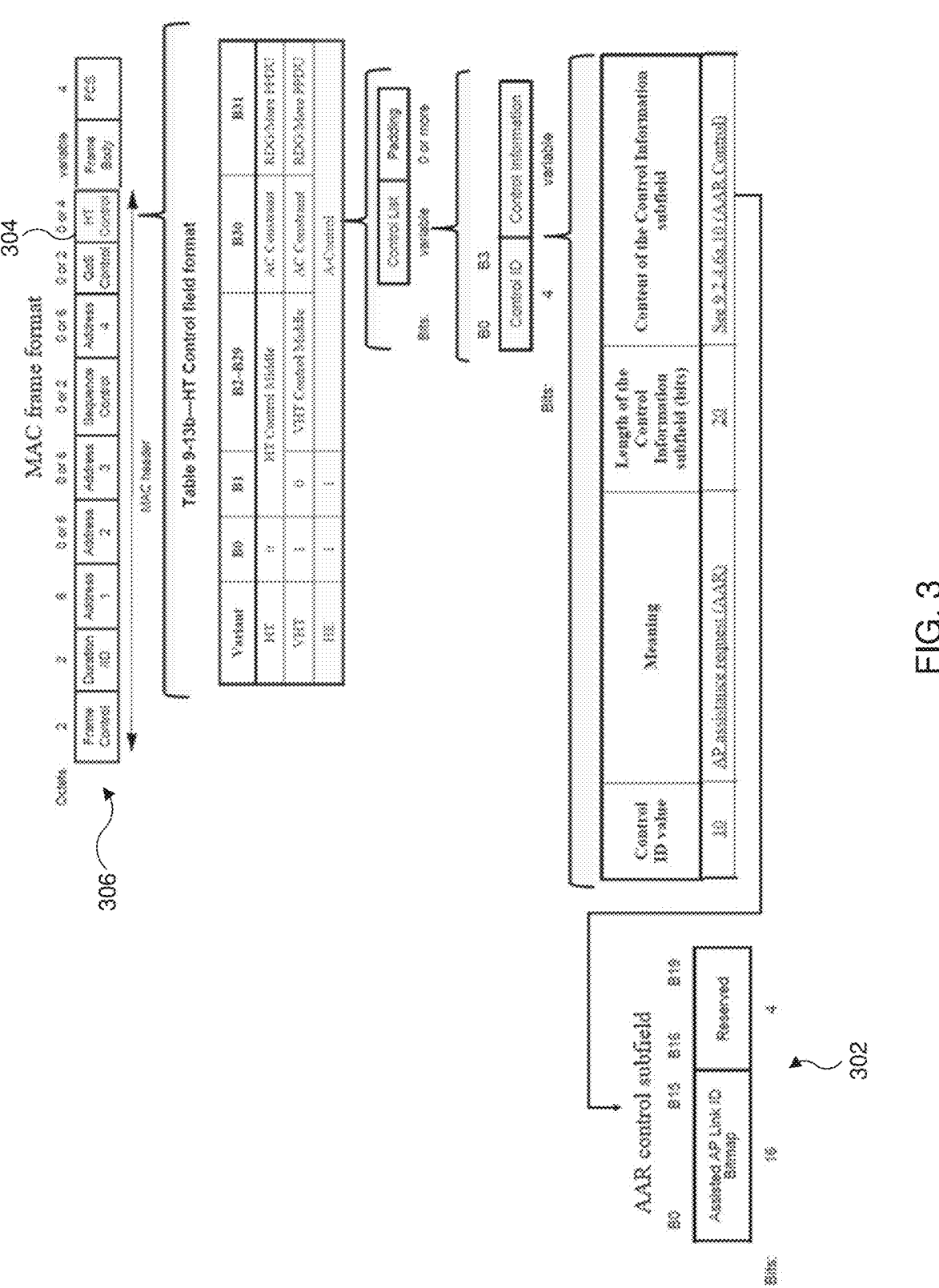
FIG. 3 illustrates an example format of an AAR Control subfield according to embodiments of the present disclosure.

FIG. 3 illustrates an example format of an AAR Control subfield according to embodiments of the present disclosure. In this example, the AAR Control subfield 302 is a subfield of the HE-variant HT Control field 304 that can be transmitted in a MAC frame 306 such as the QoS Data frame, QoS Null frame, or a management frame.

The operating procedure for EMLSR links is defined in the current 802.11be standard draft. According to this procedure, a non-AP MLD and an AP MLD may declare their ability to support EMLSR operation and the corresponding operation parameters in the enhanced multi-link (EML) capabilities subfield of the basic variant multi-link element that is shared with each other during the association process.

Figure 4:
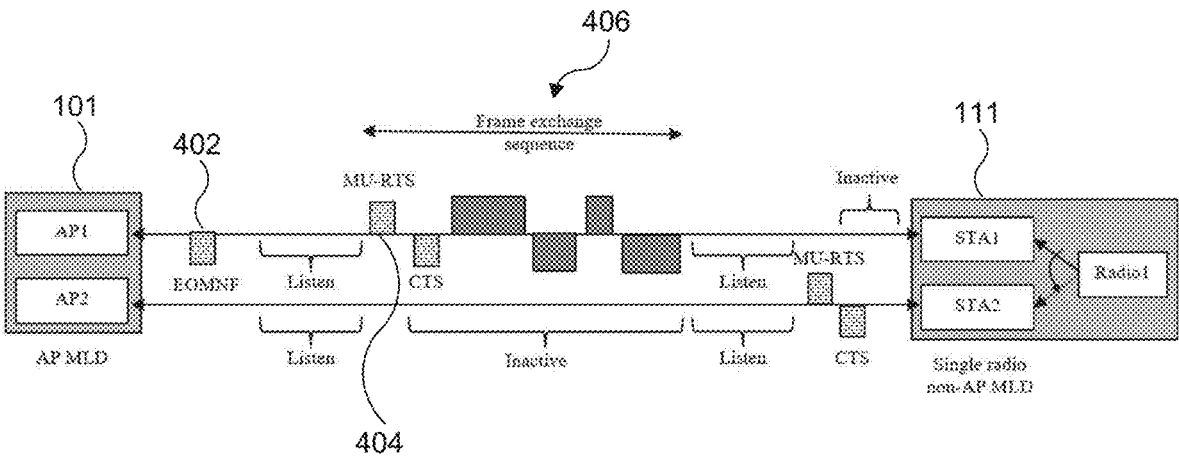
FIG. 4 illustrates an example of EMLSR operation according to embodiments of the present disclosure.

FIG. 4 illustrates an example of EMLSR operation according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

If both the AP MLD and non-AP MLD support EMLSR, then in order to initiate EMLSR operation (also referred to as activating EMLSR operating mode), a non-AP MLD first transmits an EML Operating Mode Notification Frame (EOMNF) 402, with the EML control field of the frame set to 1, to any AP affiliated with the AP MLD. The EOMNF 402 may contain several parameters for the EMLSR operation including the identity of the links that shall be considered for the EMLSR mode. Within a fixed delay (indicated in the Transition Timeout subfield of the EML capabilities subfield of the basic variant multi-link element) of transmitting the EOMNF 402, the non-AP MLD shall transition into the EMLSR mode by turning all its STAs associated with EMLSR to active and listen mode. In such a listen mode the EMLSR non-AP MLD is capable of channel sensing and reception of elementary packets.

Upon winning a TXOP on any one of the links associated with the non-AP MLD EMLSR mode, the AP MLD may initiate the frame exchange with the non-AP MLD by transmitting an initial control frame on that link. In the example of FIG. 4, this control frame is a multi-user request-to-send (MU-RTS) frame 404 transmitted on link 1 between STA1 and AP1. After receiving the initial control frame from the AP MLD on a certain link, and after a short delay, the non-AP MLD shall be capable of transmitting and receiving data on that link for the duration of the frame exchange sequence 406. All other EMLSR enabled links of the non-AP MLD (such as link 2 between AP2 and STA2) shall remain inactive for the duration of the frame exchange sequence. At the end of the frame exchange sequence, all the EMLSR enabled STAs of the non-AP MLD shall again switch back to the listen mode to either win a TXOP for uplink transmission or look for another initial control frame from the AP MLD.

To exit from an EMLSR operating mode the non-AP MLD shall transmit an EOMNF with the EML control field set to 0 to the AP MLD. After transmission of such an EOMNF from a link, the other links of the non-AP MLD shall transition into power save mode. Since simultaneous communication on multiple links is not possible in EMLSR mode, the channel access frequency on each link may be low at a non-AP MLD operating in EMLSR mode. Consequently, traffic that is only mapped to one of the EMLSR links may experience a long delay before being delivered.

As illustrated in the example of FIG. 4, when a non-AP MLD in EMLSR mode is involved in a frame exchange sequence with an AP MLD on any one of the EMLSR links, the STAs of the non-AP MLD on the remaining EMLSR links are inactive and are unable to sense the channel. Therefore, if the frame exchange sequence is longer than a threshold amount designated as MediumSyncThreshold, then the STAs of the non-AP MLD operating on the remaining EMLSR links shall be considered to have lost medium synchronization. Accordingly, a mechanism is required for recovery of medium synchronization for those STAs of a non-AP MLD after the end of the frame exchange sequence, that can protect ongoing transmissions in the channel. Since such a loss of synchronization can be frequent, a mechanism to exploit the AAR Control subfield is also beneficial to enable fast synchronization recovery.

In addition, due to the operating behavior of EMLSR whereby only one link is active at a time, uplink traffic buffered at a STA of a non-AP MLD may experience a long delay before getting access to the channel.

Figure 5:
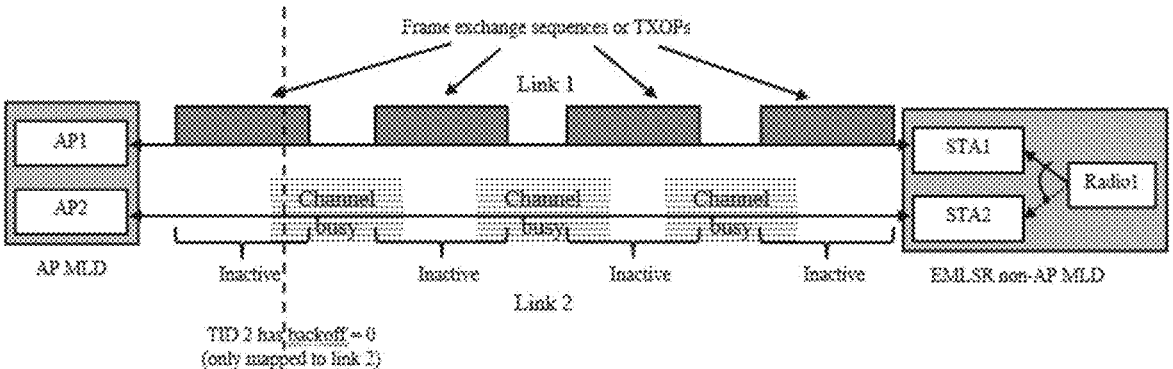
FIG. 5 illustrates an example of traffic starvation in EMLSR operation for traffic mapped to one link of an EMLSR MLD according to embodiments of the present disclosure.

FIG. 5 illustrates an example of traffic starvation in EMLSR operation for traffic mapped to one link of an EMLSR MLD according to embodiments of the present disclosure. Here a particular traffic identifier (TID), for example TID 2 of the non-AP MLD, is mapped to only link 2. When a TXOP is scheduled on link 1 with STA1, then STA2 of the same EMLSR non-AP MLD becomes inactive and thus cannot contend for the channel on link 2 even if the back-off counter for TID2 reaches zero. Consequently, another STA or the AP2 itself may win a TXOP for the channel on link 2 and make the channel busy by the time the TXOP on link 1 with STA1 ends. By the time the channel on link 2 becomes inactive again, a new TXOP may be initiated by AP1 with STA1 of the EMLSR non-AP MLD, thus making STA2 inactive again. This can potentially happen several times causing a starvation of TID 2 of the non-AP MLD which is only mapped to link 2, despite its back-off counter being at 0. Thus, a mechanism to help improve uplink EMLSR performance is beneficial.

Embodiments of the present disclosure discussed herein below provide mechanisms that enable medium synchronization recovery of the STAs of a non-AP MLD in EMLSR mode after the end of a frame exchange sequence. Mechanisms to use the AAR Control field to enable fast synchronization recovery and improve EMLSR uplink latency performance are also provided. These embodiments consider a scenario in which a non-AP MLD has a multi-link association with an AP MLD and is operating in EMLSR mode on L links. In such a scenario there may be additional links between the non-AP MLD and the AP MLD that are not EMLSR enabled links. A switch to the EMLSR mode can be made by the non-AP MLD by transmitting an EOMNF to the AP MLD with an indication of the L links to be enabled for EMLSR mode operation.

Figures 6, 7:
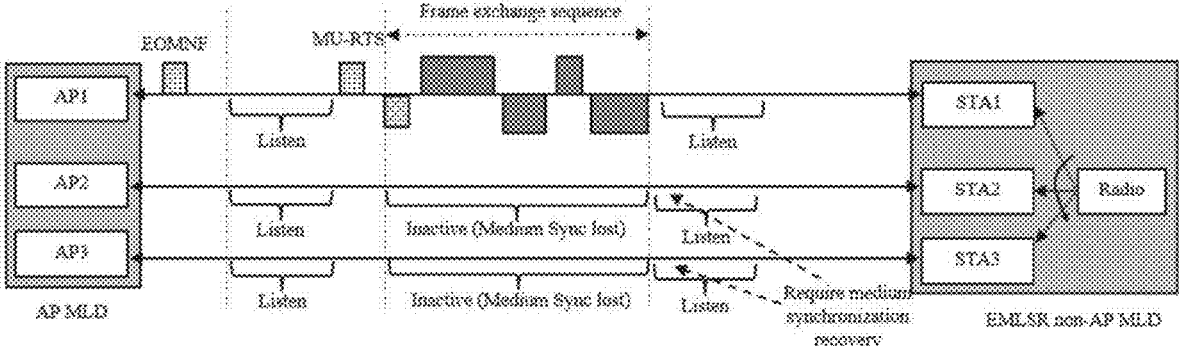
FIG. 6 illustrates an example of loss of medium synchronization on links of a non-AP EMLSR MLD that is associated with an AP MLD on multiple links according to embodiments of the present disclosure.
FIG. 7 illustrates an example format of an AAR Control subfield including a prioritized access bit according to embodiments of the present disclosure.

FIG. 6 illustrates an example of loss of medium synchronization on links of a non-AP EMLSR MLD that is associated with an AP MLD on multiple links according to embodiments of the present disclosure. In this example there are L=3 links—link 1 between AP1 and STA1, link 2 between AP2 and STA2, and link 3 between AP3 and STA3. It is understood that in other embodiments any number of APs and STAs (with corresponding links) may be present, and that other APs and STAs may be present that form links which are not EMLSR enabled links.

During a frame exchange sequence on one of the EMLSR enabled links (e.g., link 1), the other links (e.g., link 2 and link 3) become inactive and are unable to sense the channel. Accordingly, the STAs of the non-AP MLD operating on those links may lose medium synchronization, as shown for STA2 and STA3, if the frame exchange sequence is longer than a MediumSyncThreshold. Medium synchronization recovery for such STAs can occur after the frame exchange sequence on STA1 is complete and all of the EMLSR STAs of the non-AP MLD go into listen mode.

In some embodiments, after completion of a first frame exchange sequence on a first EMLSR enabled link, the other STAs of the non-AP MLD, operating on the other EMLSR links, shall be treated as having undergone a transition from a 'doze' state to an 'awake' state. Correspondingly, the mechanisms applicable for 'doze' state to 'awake' state transition in various power management features of [1] shall be applicable for the other STAs to recover medium synchronization and contend for the channel access. For example, in some embodiments, before contending for a TXOP after the end of the first frame exchange sequence, each of the STAs of the non-AP MLD associated with the other EMLSR links shall perform clear channel assessment (CCA) until a frame is detected by which it can set its NAV, or until a period of time indicated by the NAVSyncDelay from the MLME-JOIN.request primitive has transpired.

In other embodiments, after completion of a first frame exchange sequence on one EMLSR enabled link, the other STAs of the non-AP MLD operating on the other EMLSR links shall be treated as having undergone a loss of medium synchronization, as defined for the case of NSTR links in [2]. Correspondingly, the mechanisms applicable for medium synchronization loss for NSTR links shall be applicable for the other STAs to recover medium synchronization and contend for the channel access. For example, after waiting for a predetermined duration after the end of the first frame exchange sequence, each of the affected STAs may initialize a timer called a MediumSyncDelay timer and pursue a more conservative channel access/contention procedure. This conservative access procedure by an affected STA may continue until the MediumSyncDelay timer counts down to 0, or resets to 0 by detecting a frame by which the STA can set its NAV, as defined in [2]. The predetermined duration can be, for example, the EMLSR padding delay, the EMLSR switching delay, or the EMLSR transition delay.

To reduce the degradation in performance due to the loss of medium synchronization after the end of a frame exchange sequence (and associated conservative channel contention), and to more quickly obtain a TXOP for uplink transmission, several embodiments for AP assisted medium synchronization recovery for EMSLR non-AP MLDs are disclosed herein below. In some embodiments, such AP assisted recovery can also provide some additional benefits or features for the non-AP MLD as discussed below.

In a first embodiment, a first STA of the non-AP MLD in EMLSR mode with dot11AAROptionImplemented equal to true, that is operating on an EMLSR link and is involved in a frame exchange sequence with the AP MLD, may transmit the AAR Control subfield in a frame of the frame exchange sequence to its associated AP affiliated with an AP MLD, if it has received a Basic Multi-Link element from the AP with the AAR Support subfield equal to 1. For example, in FIG. 6, STA1 may transmit the AAR Control subfield to AP1 in a frame of the frame exchange sequence.

The 'Assisted AP Link ID bitmap' in the AAR Control subfield (e.g., as illustrated in AAR Control subfield 302 of FIG. 3) transmitted by the first STA shall set to 1 the bits corresponding to the link identifiers (IDs) of some of the APs affiliated with the serving AP MLD (e.g., AP2 or AP3 in FIG. 6), to solicit those APs to transmit a Trigger frame for uplink transmission to their associated STAs affiliated with the non-AP MLD (e.g., STA2 or STA3 in FIG. 6). The indicated set of APs shall be all or a subset of the APs of the AP MLD corresponding to the EMLSR links of the non-AP MLD, excluding the AP that is serving the first STA.

After waiting for a predetermined duration after the termination of the frame exchange sequence with the first STA, one of the APs affiliated with the AP MLD, among those indicated in the AAR Control subfield from the first STA, shall transmit a Trigger frame to the non-AP STA affiliated with the non-AP MLD to solicit an uplink PPDU, unless: the AP has frame exchanges already scheduled with another STA, the TXOP of such a trigger frame may violate some other requirements (for example, if the TXOP overlaps with some quiet intervals or group-addressed frames on the same link, or it overlaps with group addressed PPDUs or target beacon transmit times (TBTTs) on any of the other EMLSR enabled links of the non-AP MLD), or another AP of the AP MLD operating on one of the EMLSR links has already initiated a new frame exchange sequence with the non-AP MLD. The predetermined duration after which the Trigger frame is transmitted can be, for example, the EMLSR padding delay, the EMLSR switching delay, or the EMLSR transition delay. In one variant, the Trigger frame can be a BSRP frame, while in another variant it can be either a BSRP or an MU-RTS frame.

In a second embodiment, similar to the first embodiment, a first STA of the non-AP MLD in EMLSR mode with dot11AAROptionImplemented equal to true, that is operating on an EMLSR link and is involved in a frame exchange sequence with the AP MLD, may transmit the AAR Control subfield in a frame of the frame exchange sequence to its associated AP affiliated with an AP MLD if it has received a Basic Multi-Link element from the AP with the AAR Support subfield equal to 1.

However, in the second embodiment the first STA of the non-AP MLD shall not transmit the AAR Control subfield in a frame of the frame exchange sequence if the response trigger frame from the AP MLD is expected to overlap with the transmission of any frame that the non-AP MLD intends to receive on any of the EMLSR enabled links. Examples of such frames may include: the group addressed frames, beacon frames, restricted target wake time (rTWT) service periods (SPs), etc. Correspondingly, if the first STA of the non-AP MLD includes an AAR Control subfield in a frame of the frame exchange sequence, then one of the APs affiliated with the AP MLD—among those indicated in the AAR Control subfield from the first STA—may transmit a Trigger frame to the non-AP STA affiliated with the non-AP MLD to solicit an uplink physical protocol data unit, even if the TXOP of such a trigger frame may overlap with a TBTT or group addressed frames on any of the other EMLSR enabled links.

In a third embodiment, similar to the first embodiment, a first STA of the non-AP MLD in EMLSR mode with dot11AAROptionImplemented equal to true, that is operating on an EMLSR link and is involved in a frame exchange sequence with the AP MLD, may transmit the AAR Control subfield in a frame of the frame exchange sequence to its associated AP affiliated with an AP MLD if it has received a Basic Multi-Link element from the AP with the AAR Support subfield equal to 1.

However, in the third embodiment if an AAR Control subfield is transmitted by the first STA, then after waiting for a predetermined duration after the termination of the frame exchange sequence with the first STA, the next frame exchange sequence initiated by the AP MLD with the EMLSR non-AP MLD shall be on one of the link IDs indicated in the AAR Control subfield. This second frame exchange sequence can be initiated by a trigger frame such as the BSRP or an MU-RTS, and shall be initiated immediately by one of the indicated APs unless: the AP has frame exchanges already scheduled with another STA, the TXOP of such a trigger frame may violate some other requirements (e.g., the other requirements discussed in the first embodiment), or another AP of the AP MLD has already initiated a new frame exchange sequence with the non-AP MLD. Otherwise, the trigger frame for a second frame exchange sequence can be transmitted at a later time from one of the indicated APs.

Correspondingly, the non-AP MLD may not need to perform the EMLSR listen operation on the EMLSR links whose APs have not been indicated in the AAR Control subfield. After completion of the second frame exchange sequence, there may be no restriction on the link on which the AP MLD initiates the subsequent third frame exchange sequence with the EMLSR non-AP MLD, unless another AAR control field was included in the second frame exchange sequence.

Such an embodiment of prioritized selection of links for the next frame exchange can be beneficial for meeting latency requirements for uplink traffic at the non-AP MLD by resolving problems such as the traffic starvation illustrated in FIG. 5. In one variant of this embodiment, the prioritized selection of links for the second frame exchange sequence shall be valid only for a pre-determined time period, such as until the next TBTT, for a MediumSyncDelay time, etc. If the second frame exchange sequence does not take place before the expiration of such a time period, then there may be no restriction on the link on which the AP MLD initiates the next frame exchange sequence with the EMLSR non-AP MLD. In another variant of this embodiment, the restriction on the links to use for the next frame exchange sequence, based on the indication in the AAR Control subfield, may not be applicable if an MPDU of the first frame exchange sequence fails to be received, thus requiring retransmission.

In a fourth embodiment, similar to the first embodiment, a first STA of the non-AP MLD in EMLSR mode with dot11AAROptionImplemented equal to true, that is operating on an EMLSR link and is involved in a frame exchange sequence with the AP MLD, may transmit the AAR Control subfield in a frame of the frame exchange sequence to its associated AP affiliated with an AP MLD if it has received a Basic Multi-Link element from the AP with the AAR Support subfield equal to 1.

However, in the fourth embodiment if an AAR Control subfield is transmitted by the first STA, the 'Assisted AP Link ID bitmap' of the AAR Control subfield may be allowed to have the bit corresponding to the link ID of the first STA set to 1. In this case, the bit corresponding to the link ID of the first STA can be used as a switch between operation as per the first embodiment and the third embodiment.

To elaborate, if the link ID corresponding to the first STA is set to 0, then after waiting for a predetermined duration after the termination of the frame exchange sequence with the first STA, one of the APs affiliated with the AP MLD—among those indicated in the AAR Control subfield from the first STA—should transmit a Trigger frame to the non-AP STA affiliated with the non-AP MLD to solicit an uplink PPDU, unless one of the conditions discussed in the first embodiment applies.

On the other hand, if the link ID corresponding to the first STA is set to 1, then after waiting for a predetermined duration after the termination of the first frame exchange sequence with the first STA, the next frame exchange sequence initiated by the AP MLD with the EMLSR non-AP MLD shall be from one of the indicated APs in the AAR Control subfield, excluding the AP serving the first STA. This second frame exchange sequence can be initiated by a trigger frame and shall be initiated immediately by one of the indicated APs (excluding the AP serving first STA), unless one of the conditions discussed in the third embodiment applies. Otherwise, the trigger frame for a second frame exchange sequence can be transmitted at a later time from one of the indicated APs. In one variant, the trigger frame can be a BSRP frame, while in another variant it can be either a BSRP or an MU-RTS frame.

In a fifth embodiment, similar to the first embodiment, a first STA of the non-AP MLD in EMLSR mode with dot11AAROptionImplemented equal to true, that is operating on an EMLSR link and is involved in a frame exchange sequence with the AP MLD, may transmit the AAR Control subfield in a frame of the frame exchange sequence to its associated AP affiliated with an AP MLD if it has received a Basic Multi-Link element from the AP with the AAR Support subfield equal to 1.

However, in the fifth embodiment one new bit in the AAR Control subfield, called the prioritized access bit, can be used to indicate whether the AAR Control subfield is intended to follow operation as in the first embodiment or operation as in the third embodiment. FIG. 7 illustrates an example format of an AAR Control subfield including a prioritized access bit according to embodiments of the present disclosure.

In this embodiment, if the 'prioritized access bit' of the AAR Control subfield is set to 0, then the 'Assisted AP link ID bitmap' of the AAR Control subfield indicates the APs of the AP MLD from which an immediate trigger-based uplink assistance is sought, as in the first embodiment. To elaborate, after waiting for a predetermined duration after the termination of the frame exchange sequence with the first STA, one of the APs affiliated with the AP MLD, among those indicated in the AAR Control subfield from the first STA and excluding the AP supporting the first STA, should transmit a Trigger frame to the non-AP STA affiliated with the non-AP MLD to solicit an uplink PPDU, unless one of the conditions discussed in the first embodiment applies.

On the other hand, if the 'prioritized access bit' of the AAR Control subfield is set to 1, then the 'Assisted AP link ID bitmap' of the AAR Control subfield indicates the APs of the AP MLD that are prioritized for the next frame exchange sequence with the non-AP MLD, as in the third embodiment. To elaborate, after waiting for a predetermined duration after the termination of the first frame exchange sequence with the first STA, the next frame exchange sequence initiated by the AP MLD with the EMLSR non-AP MLD shall be from one of the indicated APs in the Assisted AP Link ID bitmap. This second frame exchange sequence can be initiated by a trigger frame and shall be initiated immediately by one of the indicated APs, unless one of the conditions discussed in the third embodiment applies. Otherwise, the trigger frame for a second frame exchange sequence can be transmitted at a later time from one of the indicated APs.

In the fifth embodiment, when the prioritized access bit is set to 1 in an AAR Control subfield transmitted by a first non-AP STA, the bit corresponding to the link of the first STA can also be set to 1 in the 'Assisted AP Link ID bitmap', to include the link for prioritized access for the next frame exchange. In one variant of this embodiment, the trigger frame can be a BSRP frame, while in another variant it can be either a BSRP or an MU-RTS frame.

FIGS. 8A and 8B illustrate an example process for enabling medium synchronization recovery and AAR operation by an EMLSR non-AP MLD and an AP MLD according to embodiments of the present disclosure. FIG. 8A illustrates the process as performed by the EMLSR non-AP MLD, and FIG. 8B illustrates the process as performed by the AP MLD.

In one variant, the fourth and fifth embodiments may also be applied to the scenario where the non-AP MLD is an NSTR device. In this case, a first STA of the NSTR non-AP MLD with dot11AAROptionImplemented equal to true, that is involved in a first frame exchange sequence with the AP MLD, may transmit the AAR Control subfield in a frame of the first frame exchange sequence to its associated AP affiliated with the AP MLD if it has received a Basic Multi-Link element from the AP with the AAR Support subfield equal to 1 and if the first STA is part of an NSTR link pair. In addition, the Assisted AP Link ID bitmap of the AAR Control subfield transmitted by the first STA is not allowed to have the bit corresponding to the link ID of any STA of the same MLD that is not part of an NSTR link pair with STA 1 set to 1. Furthermore, in this variant, the second frame exchange sequence can be initiated by a trigger frame and shall be initiated immediately by one of the indicated APs, unless the AP has frame exchanges already scheduled with another STA, or the TXOP of such a trigger frame may violate some other requirements (e.g., the requirements discussed above in the fourth and fifth embodiments).

The above mechanisms for medium synchronization recovery can help protect ongoing transmissions on a link from being affected due to the loss of medium synchronization at an EMLSR non-AP MLD after a frame exchange sequence. The above processes for transmission of an AAR Control subfield can help the EMLSR non-AP MLD quickly obtain a TXOP for uplink transmission despite it suffering from medium synchronization loss and thus having to use a conservative channel access method. The above mechanisms can also help the non-AP MLD influence on which link, among the EMLSR links, the next frame exchange sequence shall take place. Thus, these mechanisms can improve the efficiency and throughput of EMLSR devices.

Due to the operating behavior of EMLSR, the channel access patterns for a non-AP device can be altered significantly after activating EMLSR mode. For example, to limit the overhead of channel switching required for EMLSR, longer TXOP durations may be used. Additionally, since simultaneous communication on multiple links is not possible, the channel access frequency on each link may be reduced after activating EMLSR mode. In some cases, the EMLSR mode may only be activated on a subset of the links of a non-AP device that were previously enabled, where the remaining links may either be idle/inactive or may operate independently of EMLSR. In another case, the EMLSR mode may be activated on a superset of the links of the non-AP device that were previously enabled.

In all of the above scenarios, a TID-to-link mapping that was negotiated between an AP MLD and a non-AP MLD before activating EMLSR operating mode may not be optimal for operation in EMLSR mode. Accordingly, a non-AP device may desire to switch to EMLSR mode only if an update to a desired TID-to-link mapping is accepted. Similarly, the AP MLD may desire to know that a new TID-to-link mapping request by a non-AP MLD is for the purpose of supporting EMLSR operation. In addition, in some scenarios, an AP MLD may be capable of operating in EMLSR mode only for certain TID-to-link mappings. Thus, it would be beneficial to include a TID-to-link mapping negotiation as part of the EMLSR mode activation (or initiation) process between an AP MLD and a non-AP MLD.

Existing mechanisms for TID-to-link mapping negotiation are performed outside of the context of EMLSR and thus cannot resolve the aforementioned problems. For example, a TID-to-link mapping request (as defined in [2]) transmitted by a non-AP MLD before EMLSR activation cannot convey to the AP MLD that the request is for the purpose of activating EMLSR mode. Similarly, if a TID-to-link mapping request is transmitted by the non-AP MLD after switching to EMLSR mode, such a request can be rejected. This may create unnecessary race conditions in which a non-AP MLD first enters EMLSR mode and then exits if the desired TID-to-link mapping is rejected.

Accordingly, mechanisms and methods for implicitly or explicitly negotiating an updated TID-to-link mapping between a non-AP MLD and an AP MLD as part of the EMLSR initiation (or activation) process are disclosed herein below. Embodiments of these methods consider several types of non-AP MLDs operating in different scenarios, and that may desire to switch their operation mode to EMLSR mode.

Figures 9, 10, 11, 12:
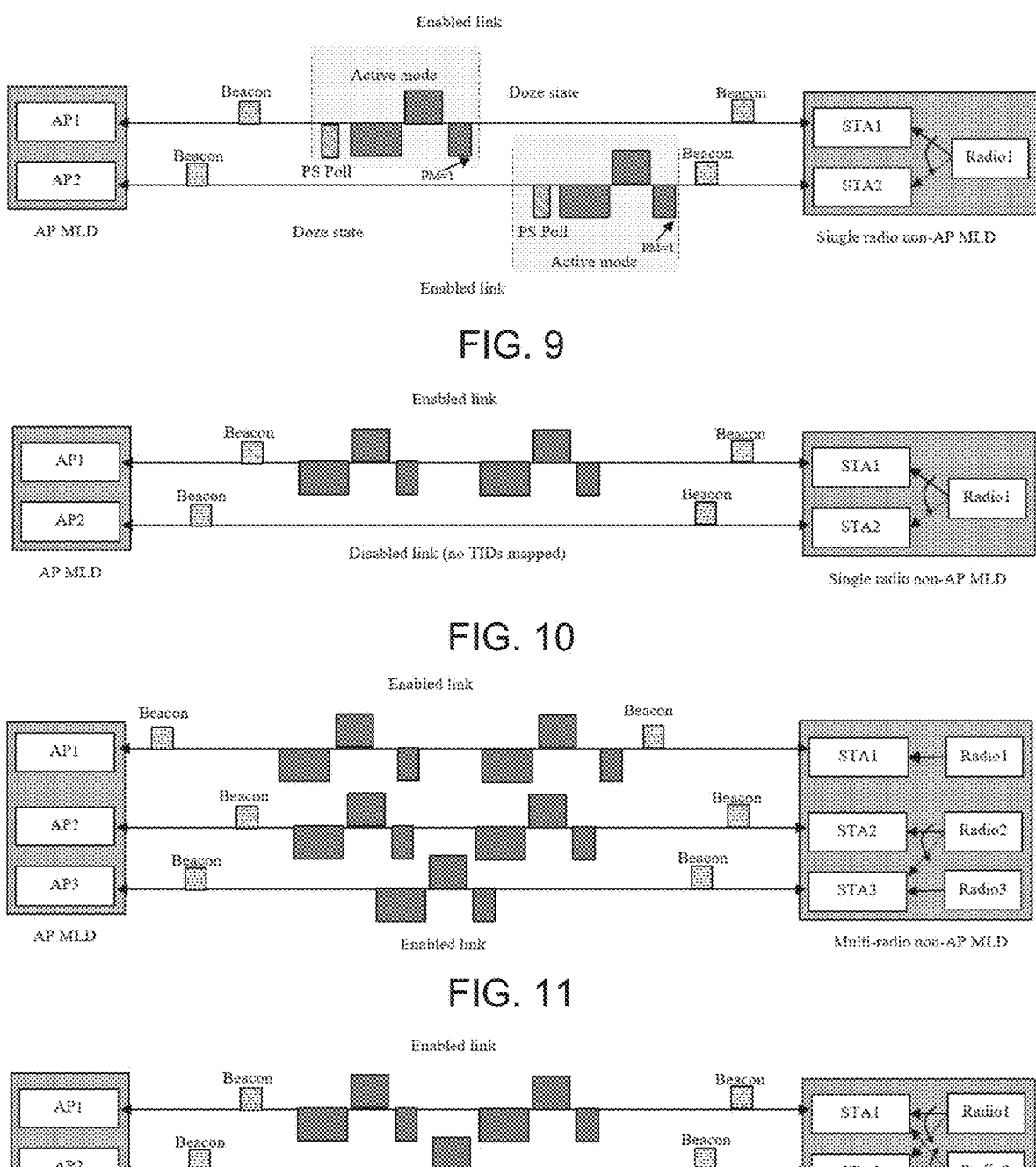
FIG. 9 illustrates an example operation scenario of a non-AP MLD desiring to switch to EMLSR operation mode according to embodiments of the present disclosure.
FIG. 10 illustrates another example operation scenario of a non-AP MLD desiring to switch to EMLSR operation mode according to embodiments of the present disclosure.
FIG. 11 illustrates another example operation scenario of a non-AP MLD desiring to switch to EMLSR operation mode according to embodiments of the present disclosure.
FIG. 12 illustrates another example operation scenario of a non-AP MLD desiring to switch to EMLSR operation mode according to embodiments of the present disclosure.

FIG. 9 illustrates an example operation scenario of a non-AP MLD desiring to switch to EMLSR operation mode according to embodiments of the present disclosure. In FIG. 9, the non-AP MLD has a single radio, is associated with the AP MLD on multiple links, and is using power save states to communicate with the AP MLD on the multiple links via time-division access. The non-AP MLD may decide to activate a link when it has traffic by sending a PS poll and may put the other links in doze state. It may also have negotiated a TID-to-link mapping for distinguishing the traffic that can be transmitted on each of the links. To improve the chances of channel access by considering all links, instead of using a fixed schedule for activating links, the non-AP MLD may desire to switch to EMLSR operating mode. After transitioning into EMLSR operation mode, when the AP MLD triggers a particular link with the non-AP MLD using an initial control frame, the single radio (Radio1) of the non-AP MLD may be connected to the corresponding STA for frame exchange.

FIG. 10 illustrates another example operation scenario of a non-AP MLD desiring to switch to EMLSR operation mode according to embodiments of the present disclosure. In FIG. 10, the non-AP MLD has a single radio and is associated with the AP MLD on multiple links as in the scenario of FIG. 9, but here the non-AP MLD is using TID-to-link mapping to disable some of the links and is only communicating on one link. In such a scenario, the non-AP MLD may desire to switch to EMLSR operating mode to contend for TXOP on multiple links and thus improve throughput. After transitioning into EMLSR operation mode, when the AP MLD triggers a particular link with the non-AP MLD using an initial control frame, the single radio (Radio1) of the non-AP MLD may be connected to the corresponding STA for frame exchange.

FIG. 11 illustrates another example operation scenario of a non-AP MLD desiring to switch to EMLSR operation mode according to embodiments of the present disclosure. In FIG. 11, the non-AP MLD has multiple radios, is associated with the AP MLD on multiple links, and is communicating with the AP MLD in parallel on all links. However, to save power or for other considerations the non-AP device may desire to switch to an EMLSR mode of operation on all or a subset of the enabled links (e.g., link 2 and link 3). After transitioning into EMLSR operation mode, when the AP MLD triggers a particular link with the non-AP MLD using an initial control frame, one radio of the non-AP MLD may be connected to the corresponding STA for frame exchange (e.g., Radio2), while the remaining radios (e.g., Radio1, Radio3) may be put in a low power state.

FIG. 12 illustrates another example operation scenario of a non-AP MLD desiring to switch to EMLSR operation mode according to embodiments of the present disclosure. In FIG. 12, the non-AP MLD has multiple radios (with their corresponding radio-frequency chains), is associated with the AP MLD on multiple links, and is communicating with the AP MLD in parallel on all links. Due to high channel contention on some of the enabled links, the opportunity for gaining a TXOP may be low on some of the links. Thus, the radio of link 1 may be under-utilized when link 1 is busy. To utilize the available radios in a more efficient manner, the MLD may decide to switch to the EMLSR mode of operation. After transitioning to EMLSR operation, upon gaining a TXOP on any one link, all of the available radio-frequency chains at the non-AP MLD may be assigned to that link to support a higher number of spatial streams.

For all the above scenarios, the channel access pattern at the non-AP MLD may change significantly after activation of the EMLSR mode, and thus the non-AP MLD may desire to update the TID-to-link mapping. For example, in the scenario of FIG. 9, prior to the switch to EMLSR operation, the active and sleep mode switching on each link is controlled by the non-AP MLD via the PS poll. Note that the AP buffers downlink traffic until the non-AP MLD sends a PS poll, so the non-AP MLD in a sense determines the downlink traffic periods (by controlling when it is awake on that link).

However, after EMLSR activation the downlink channel access on each link may not be completely controlled by the non-AP MLD in such a deterministic manner. The downlink channel access is controlled by when the AP MLD wins a TXOP and sends an initial control frame on each link. Furthermore, an active TXOP on one link precludes transmissions on the other link during EMLSR operation. Thus, the non-AP MLD may desire to update the TID-to-link mapping to meet its traffic requirements after the change in traffic access pattern.

Similarly, in the scenario of FIG. 10, prior to the switch to EMLSR operation, a few of the links may be disabled with no TIDs being mapped to them. However, this can be undesirable when activating the EMLSR mode.

In the scenario of FIG. 11, the non-AP MLD may decide to transition only a subset of the links into EMLSR mode and keep the remaining links in doze state for power saving purposes. Thus, to prevent traffic mapped to the dozed links from suffering too much, the non-AP MLD may desire to update the TID-to-link mapping after activating EMLSR.

In the scenario of FIG. 12, after the switch to EMLSR operation the channel access opportunities on each individual links can reduce considerably, although the number of spatial streams (and hence throughput) can be increased. Thus, it may be desirable to update the TID-to-link mapping to map latency-sensitive traffic to both links to ensure they do not suffer too much.

Indeed, in many of these scenarios the non-AP MLD may desire to activate EMLSR only if a new TID-to-link mapping is accepted by the AP MLD. In addition, the non-AP MLD may desire to activate the new TID-to-link mapping only if the EMLSR mode activation is accepted by the AP MLD and may desire to use it only for the duration of the EMLSR mode of operation. Furthermore, the AP MLD may also desire to know that the new TID-to-link mapping request received from the non-AP MLD is for supporting EMLSR mode, so that it can make a decision accordingly. Finally, due to implementation complexities, the AP MLD may be capable of supporting EMLSR mode only with some TID-to-link mappings. This suggests that an implicit or explicit negotiation of the TID-to-link mapping as part of the EMLSR mode activation procedure can be desirable.

Figures 13, 14:
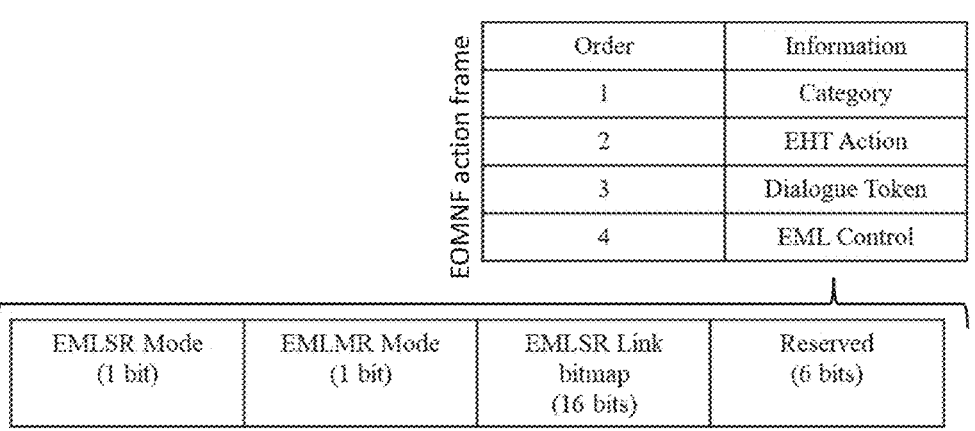
FIG. 13 illustrates an example format of an EOMNF action frame according to embodiments of the present disclosure.
FIG. 14 illustrates another example format of an EOMNF action frame according to embodiments of the present disclosure.

FIG. 13 illustrates an example format of an EOMNF action frame according to embodiments of the present disclosure. In one embodiment, a new TID-to-link mapping may not be explicitly negotiated upon EMLSR activation. Instead, when switching to EMLSR mode by transmission of an EOMNF by a non-AP MLD with the 'EMLSR Mode' bit set to 1, it may be assumed that a pre-determined TID-to-link mapping shall be applicable for the duration of the EMLSR operation mode.

The pre-determined TID-to-link mapping can be, for example, the default TID-to-link mapping wherein every TID is mapped to every EMLSR link of the non-AP MLD. The default mapping can be beneficial since it reduces the number of required "link switches" of EMLSR thus reducing the corresponding overhead of switching time and initial control frame transmission. If a non-AP MLD wishes to change to a non-default TID-to-link mapping during the EMLSR mode, it can send a new TID-to-link mapping request frame (as defined in [2]) after switching to the EMLSR mode.

When an EOMNF is transmitted by the non-AP MLD with the 'EMLSR mode' bit set to 0 to disable EMLSR mode, in one embodiment, no change to the currently operational TID-to-link mapping may be applied. In another embodiment, when an EOMNF is transmitted by the non-AP MLD with the 'EMLSR mode' bit set to 0, the TID-to-link mapping that was active before the activation of the EMLSR mode can be reactivated. In one variant of this embodiment, the reactivation of the default TID-to-link mapping can be realized by following a tear-down procedure of the existing TID-to-link mapping between the non-AP MLD and the AP MLD, either implicitly or explicitly (i.e., via transmission of a TID-to-link mapping tear drown frame).

FIG. 14 illustrates another example format of an EOMNF action frame according to embodiments of the present disclosure. When switching to EMLSR mode, a non-AP MLD might either want to retain its existing TID-to-link mapping or may desire to switch to a predefined TID-to-link mapping. The pre-determined TID-to-link mapping can be, for example, the default TID-to-link mapping where every TID is mapped to every EMLSR link of the non-AP MLD. To enable this, as illustrated in FIG. 14, one bit of the EML control field of the EOMNF action frame can be reserved to indicate whether a switch to a pre-determined TID-to-link mapping is desired.

In this embodiment, a non-AP MLD may transmit an EOMNF with the EMLSR mode bit set to 1 and the 'Default TID-to-link mapping' subfield of the EML control field set to 1 in order to request that the EMLSR mode be enabled and that the pre-defined TID-to link mapping be used for the duration of EMLSR operation. On the other hand, a non-AP MLD may transmit an EOMNF with the EMLSR mode bit set to 1 and the 'Default TID-to-link mapping' subfield of the EML control field set to 0 in order to request that the EMLSR mode be enabled, and the currently existing TID-to link mapping be used for the EMLSR duration.

An AP MLD, upon receipt of the EOMNF of FIG. 14, shall send an EOMNF response frame with the same value in the 'Default TID-to-link mapping' subfield as it received from the non-AP MLD in order to indicate that it accepts activation of EMLSR mode for the non-AP MLD with the requested TID-to-link mapping. The AP MLD may also flip the default TID-to-link mapping bit in the EOMNF response frame to indicate that it is unwilling to support the requested TID-to-link mapping for the EMLSR mode.

A non-AP MLD may transmit an EOMNF with the 'EMLSR mode' bit set to 0 and the 'Default TID-to-link mapping' subfield of the EML control field is set to 1 in order to request that the EMLSR mode be disabled, and the pre-determined TID-to-link mapping be used after disabling the EMLSR mode. On the other hand, a non-AP MLD may transmit an EOMNF with the 'EMLSR mode' bit set to 0 and the 'Default TID-to-link mapping' subfield set to 0 in order to request that the EMLSR mode be disabled, and the existing TID-to-link mapping be used after disabling the EMLSR mode.

If either the non-AP MLD or the AP MLD has the TID-to-link Mapping Negotiation Supported subfield in the MLD capabilities field of the Basic variant multi-link element set to 0, then the Default TID-to-link mapping bit may be set to 1 or can be ignored in any EOMNF. In one variant of this embodiment, the switch to the default TID-to-link mapping can be realized by following a tear-down procedure of the existing TID-to-link mapping between the non-AP MLD and the AP MLD, either implicitly or explicitly (i.e., via transmission of a TID-to-link mapping tear drown frame).

FIG. 15 illustrates another example format of an EOMNF action frame according to embodiments of the present disclosure. When switching to EMLSR mode, a non-AP MLD might either want to retain its existing TID-to-link mapping or negotiate a new TID-to-link mapping. To enable this, an optional TID-to-link mapping element and a 'TID-to-link mapping present' bit are included in the EOMNF action frame, as illustrated in FIG. 15, to indicate a new requested TID-to-link mapping. The 'TID-to-link mapping present bit' can be used to indicate if the optional TID-to-link mapping element is included in the EOMNF.

In this embodiment, a non-AP MLD may transmit an EOMNF with the EMLSR mode bit set to 1 and including of a TID-to-link mapping element in order to request that EMLSR mode be enabled, and the new TID-to-link mapping included in the TID-to-link mapping field be used during the EMLSR operation. To indicate that the TID-to-link mapping field is present in the EOMNF, the TID-to-link mapping bit can be set to 1.

On the other hand, a non-AP MLD may transmit an EOMNF with the EMLSR mode bit set to 1 and without a TID-to-link mapping field in order to request that EMLSR be enabled and that the existing TID-to-link mapping be used during the EMLSR operation. To indicate that the TID-to-link mapping field is not present in the EOMNF, the TID-to-link mapping bit can be set to 0.

The non-AP MLD may not initiate transition to EMLSR mode until it receives a response EOMNF from the AP MLD. Upon receipt of an EOMNF from a non-AP MLD with an included TID-to-link mapping field, an AP MLD shall send a response EOMNF with the same TID-to-link mapping field as it received in order to indicate that it accepts EMLSR mode activation with the new TID-to-link mapping. Similarly, upon receipt of an EOMNF from a non-AP MLD without a TID-to-link mapping field, an AP MLD shall send a response EOMNF without a TID-to-link mapping field in order to indicate that it accepts the EMLSR mode activation with the existing TID-to-link mapping.

On the other hand, if for any received EOMNF from a non-AP MLD the AP MLD determines that the TID-to-link mapping is unacceptable for EMLSR operation, it may transmit a response EOMNF with an included TID-to-link mapping field that contains a new suggested or preferred TID-to-link mapping for EMLSR operation. The AP MLD may take the set of activated links for EMLSR, indicated in the EMLSR link bitmap field, into consideration for determining if the requested TID-to-link mapping is acceptable and in determining the new suggested TID-to-link mapping to be included in the response EOMNF.

In one variant of the embodiment, if a response EOMNF with a TID-to-link mapping field is received at a non-AP MLD from the AP MLD in a response to a first EOMNF transmitted by the non-AP MLD to the AP MLD, and if the first EOMNF either did not have a TID-to-link mapping field, or its TID-to-link mapping field does not match with the TID-to-link mapping field in the response EOMNF, then the non-AP MLD may not transition into EMLSR mode. Instead, it may determine if the new suggested TID-to-link mapping in the response EOMNF from the AP MLD is acceptable. If it is acceptable, the non-AP MLD may transmit a new EOMNF to the AP MLD with a new TID-to-link mapping field that matches the suggested TID-to-link mapping received from the AP MLD.

In another variant of the embodiment, upon receipt of any response EOMNF from an associated AP MLD, the non-AP MLD shall unconditionally switch to the EMLSR mode using the TID-to-link mapping provided in the response EOMNF by the AP MLD. If the non-AP MLD does not prefer the TID-to-link mapping, it can then send a fresh TID-to-link mapping request after switching to the EMLSR mode.

A non-AP MLD may transmit an EOMNF with the 'EMLSR mode' bit set to 0 and with a TID-to-link mapping field in order to request that the EMLSR mode be disabled, and the new TID-to-link mapping indicated in the TID-to-link mapping field be used after disabling the EMLSR mode. On the other hand, a non-AP MLD may transmit an EOMNF with the 'EMLSR mode' bit set to 0 and without a TID-to-link mapping field in order to request that the EMLSR mode be disabled, and the existing TID-to-link mapping be used after disabling the EMLSR mode.

In the case where either the non-AP MLD or the AP MLD has a TID-to-link Mapping Negotiation Supported subfield in the MLD capabilities field of the Basic variant multi-link element set to 0, the TID-to-link mapping field may be excluded, and the TID-to-link mapping present bit may be set to 0 in any EOMNF.

FIG. 16 illustrates a variation of the example format of the EOMNF action frame of FIG. 15 according to embodiments of the present disclosure. In another variant of the embodiments of FIG. 15, two TID-to-link mapping elements can be included in an EOMNF to indicate different traffic mappings in the uplink and in the downlink directions, as illustrated in FIG. 16. Similarly, in a response EOMNF, a status code field can be included (similar to the TID-to-link mapping response frame in [2]) to explicitly indicate if the requested TID-to-link mapping is accepted, rejected, and additionally, if one or more TID-to-link mapping elements are included in the EOMNF, as preferred TID-to-link mappings.

Figures 17A, 17B:
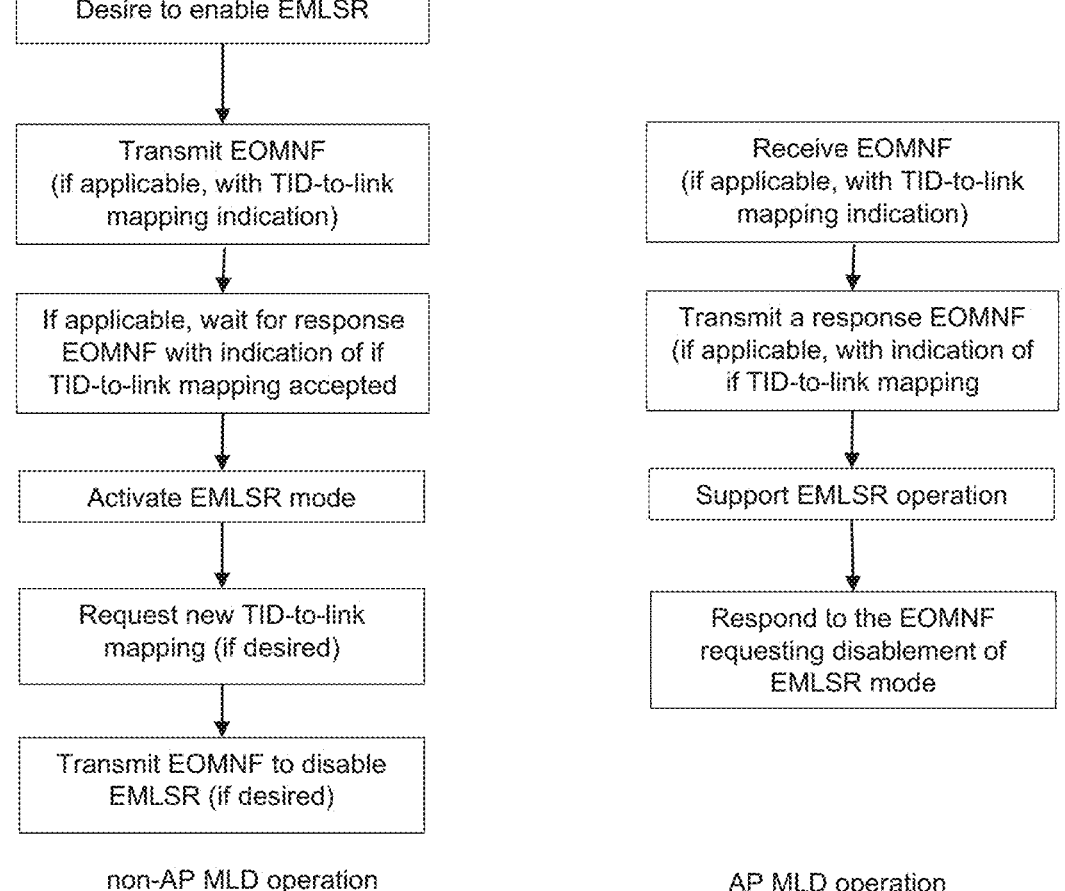
FIGS. 17A and 17B illustrate an example process for enabling and disabling EMLSR mode operation including updates to TID-to-link mapping according to embodiments of the present disclosure.

FIGS. 17A and 17B illustrate an example process for enabling and disabling EMLSR mode operation including updates to TID-to-link mapping according to embodiments of the present disclosure. FIG. 17A illustrates the process as performed by the EMLSR non-AP MLD, and FIG. 17B illustrates the process as performed by the AP MLD.

FIG. 18 illustrates an example process for facilitating recovery from loss of medium synchronization for MLDs in a WLAN according to various embodiments of the present disclosure. The process of FIG. 18 is discussed as being performed by a non-AP MLD, but it is understood that a corresponding AP MLD performs a corresponding process. Additionally, for convenience the process of FIG. 18 is discussed as being performed by a WI-FI non-AP MLD comprising a plurality of STAs that each comprise a transceiver configured to configured to form a link with a corresponding AP affiliated with a WI-FI AP MLD, wherein at least a subset of the links are EMLSR links that are configured to operate in an EMLSR mode of operation. However, it is understood that any suitable wireless communication device could perform these processes.

Referring to FIG. 18, the process begins with the non-AP MLD generating, based on a determination that an EMLSR frame exchange sequence is occurring on a first one of the EMLSR links, a request for AAR for a set of the other EMLSR links (step 1805). The non-AP MLD may identify, in the request for AAR, the set of other EMLSR links for which AAR is requested. The non-AP MLD may also include, in the request for AAR, an indication that the request for AAR is either: a request for trigger-based uplink assistance from the AP MLD on one of the set of other EMLSR links, or a request for one of the set of other EMLSR links to be prioritized by the AP MLD for a next downlink EMLSR frame exchange sequence.

In some embodiments, at step 1805 the non-AP MLD generates the request for AAR as an AAR Control subfield in a frame of the EMLSR frame exchange sequence. The AAR Control subfield may include an Assisted AP Link ID bitmap that indicates each EMLSR link of the set of other EMLSR links for which AAR is requested. The AAR Control subfield may also include a prioritized access bit that indicates that the request for AAR is either a request for trigger-based uplink assistance from the AP MLD on one of the EMLSR links indicated in the Assisted AP Link ID bitmap, or a request for one of the EMLSR links indicated in the Assisted AP Link ID bitmap to be prioritized by the AP MLD for a next EMLSR frame exchange sequence.

Next, the non-AP MLD transmits, to the AP MLD, the request for AAR (step 1810). The non-AP MLD may transmit the request for AAR to the AP MLD over the first EMLSR link as a frame of the EMLSR frame exchange sequence.

The non-AP MLD then receives, from the AP MLD after the EMLSR frame exchange sequence has ended, a trigger frame over a second EMLSR link, which is one of the set of other EMLSR links for which AAR is requested (step 1815). In some embodiments, the trigger frame solicits an uplink frame from the STA that corresponds to the second EMLSR link. In other embodiments, the trigger frame is an initial control frame that initiates a next downlink EMLSR frame exchange sequence on the second EMLSR link with the STA that corresponds to the second EMLSR link.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD), comprising:

stations (STAs), each comprising a transceiver configured to form a link with a corresponding AP of an AP MLD, wherein at least a subset of the links are enhanced multi-link single radio (EMLSR) links that are configured to operate in an EMLSR mode of operation; and a processor operably coupled to the STAs, the processor configured to generate, based on a determination that an EMLSR frame exchange sequence is occurring on a first one of the EMLSR links, a request for AP-assisted medium synchronization recovery (AAR) for a set of the other EMLSR links, wherein:

at least one of the transceivers is further configured to transmit, to the AP MLD, the request for AAR over the first EMLSR link within a frame of the EMLSR frame exchange sequence, and the processor is further configured to generate the request for AAR as an AAR Control subfield in a frame of the EMLSR frame exchange sequence, the AAR Control subfield including:

an Assisted AP Link ID bitmap that indicates each EMLSR link of the set of other EMLSR links for which AAR is requested, and a prioritized access bit that indicates that the request for AAR is either:

a request for trigger-based uplink assistance from the AP MLD on one of the EMLSR links indicated in the Assisted AP Link ID bitmap; or a request for one of the EMLSR links indicated in the Assisted AP Link ID bitmap to be prioritized by the AP MLD for a next EMLSR frame exchange sequence.

2. The non-AP MLD of claim 1, wherein:

at least one of the transceivers is further configured to receive, from the AP MLD after the EMLSR frame exchange sequence has ended, a trigger frame over a second EMLSR link, which is one of the set of other EMLSR links for which AAR is requested, and the trigger frame solicits an uplink frame from the STA that corresponds to the second EMLSR link.

3. The non-AP MLD of claim 1, wherein:

at least one of the transceivers is further configured to receive, from the AP MLD after the EMLSR frame exchange sequence has ended, an initial control frame over a second EMLSR link, which is one of the set of other EMLSR links for which AAR is requested, and the initial control frame initiates a next downlink EMLSR frame exchange sequence on the second EMLSR link with the STA that corresponds to the second EMLSR link.

4. The non-AP MLD of claim 1, wherein:

the processor is further configured to identify, in the request for AAR, the set of other EMLSR links for which AAR is requested.

5. The non-AP MLD of claim 1, wherein:

the processor is further configured to include, in the request for AAR, an indication that the request for AAR is either:

a request for trigger-based uplink assistance from the AP MLD on one of the set of other EMLSR links, or a request for one of the set of other EMLSR links to be prioritized by the AP MLD for a next downlink EMLSR frame exchange sequence.

6. An access point (AP) multi-link device (MLD), comprising:

APs, each comprising a transceiver configured to form a link with a corresponding station (STA) of a non-AP MLD, wherein:

at least a subset of the links are enhanced multi-link single radio (EMLSR) links that are configured to operate in an EMLSR mode of operation, and at least one of the transceivers is further configured to receive, from the non-AP MLD, a request for AP-assisted medium synchronization recovery (AAR) over a first EMLSR link within a frame of an EMLSR frame exchange sequence; and a processor operably coupled to the APs, the processor configured to determine that the request for AAR is a request to perform, after an EMLSR frame exchange sequence on a first one of the EMLSR links has ended, AAR for a set of the EMLSR links, wherein:

the request for AAR is an AAR Control subfield in a frame of the EMLSR frame exchange sequence, the AAR Control subfield including:

an Assisted AP Link ID bitmap that indicates each EMLSR link of the set of other EMLSR links for which AAR is requested, and a prioritized access bit that indicates that the request for AAR is either:

a request for trigger-based uplink assistance from the AP MLD on one of the EMLSR links indicated in the Assisted AP Link ID bitmap; or a request for one of the EMLSR links indicated in the Assisted AP Link ID bitmap to be prioritized by the AP MLD for a next EMLSR frame exchange sequence.

7. The AP MLD of claim 6, wherein:

at least one of the transceivers is further configured to transmit, to the non-AP MLD after the EMLSR frame exchange sequence has ended, a trigger frame over a second EMLSR link, which is one of the set of other EMLSR links for which AAR is requested, and the trigger frame solicits an uplink frame from the STA that corresponds to the second EMLSR link.

8. The AP MLD of claim 6, wherein:

at least one of the transceivers is further configured to transmit, to the non-AP MLD after the EMLSR frame exchange sequence has ended, an initial control frame over a second EMLSR link, which is one of the set of other EMLSR links for which AAR is requested, and the initial control frame initiates a next downlink EMLSR frame exchange sequence on the second EMLSR link with the STA that corresponds to the second EMLSR link.

9. The AP MLD of claim 6, wherein:

the processor is further configured to determine, from the request for AAR, the set of other EMLSR links for which AAR is requested.

10. The AP MLD of claim 6, wherein:

the processor is further configured to determine, from an indication in the request for AAR, that the request for AAR is either:

a request for trigger-based uplink assistance from the AP MLD on one of the set of other EMLSR links, or a request for one of the set of other EMLSR links to be prioritized by the AP MLD for a next downlink EMLSR frame exchange sequence.

11. A method of wireless communication performed by a non-access point (AP) multi-link device (MLD), the method comprising:

generating, based on a determination that an EMLSR frame exchange sequence is occurring on a first one of enhanced multi-link single radio (EMLSR) links, a request for AP-assisted medium synchronization recovery (AAR) for a set of the other EMLSR links, wherein the non-AP MLD comprises stations (STAs) that each comprise a transceiver configured to form a link with a corresponding AP of an AP MLD and wherein at least a subset of the links are the EMLSR links that are configured to operate in an EMLSR mode of operation; and transmitting, to the AP MLD, the request for AAR over the first EMLSR link within a frame of the EMLSR frame exchange sequence;

wherein:

the request for AAR is an AAR Control subfield in a frame of the EMLSR frame exchange sequence, the AAR Control subfield including:

an Assisted AP Link ID bitmap that indicates each EMLSR link of the set of other EMLSR links for which AAR is requested, and a prioritized access bit that indicates that the request for AAR is either:

a request for trigger-based uplink assistance from the AP MLD on one of the EMLSR links indicated in the Assisted AP Link ID bitmap; or a request for one of the EMLSR links indicated in the Assisted AP Link ID bitmap to be prioritized by the AP MLD for a next EMLSR frame exchange sequence.

12. The method of claim 11, further comprising:

receiving, from the AP MLD after the EMLSR frame exchange sequence has ended, a trigger frame over a second EMLSR link, which is one of the set of other EMLSR links for which AAR is requested, wherein the trigger frame solicits an uplink frame from the STA that corresponds to the second EMLSR link.

13. The method of claim 11, further comprising:

receiving, from the AP MLD after the EMLSR frame exchange sequence has ended, an initial control frame over a second EMLSR link, which is one of the set of other EMLSR links for which AAR is requested, wherein the initial control frame initiates a next downlink EMLSR frame exchange sequence on the second EMLSR link with the STA that corresponds to the second EMLSR link.

14. The method of claim 11, further comprising identifying, in the request for AAR, the set of other EMLSR links for which AAR is requested.

\* \* \* \* \*